United States Patent
Takeuchi et al.

(10) Patent No.: US 6,642,970 B1
(45) Date of Patent: Nov. 4, 2003

(54) SINGLE PANEL COLOR PROJECTOR

(75) Inventors: Kesatoshi Takeuchi, Shiozimi (JP); Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 09/711,100

(22) Filed: Nov. 14, 2000

(30) Foreign Application Priority Data

Nov. 19, 1999 (JP) .......................................... 11-329728

(51) Int. Cl.⁷ ................................................. H04N 9/31
(52) U.S. Cl. ...................... 348/744; 348/743; 348/760; 348/761; 348/766
(58) Field of Search ................................. 348/742, 744, 348/743, 759, 760, 761, 764, 766, 770, 771; 359/634, 889, 891, 892; 353/84, 32, 33, 31, 34, 37; 349/5, 8, 9, 95; H04N 9/31

(56) References Cited

U.S. PATENT DOCUMENTS 5,548,349 A * 8/1996 Mizuguchi et al. ......... 348/766

FOREIGN PATENT DOCUMENTS

| JP | A 6-265894 | 9/1994 |
| JP | A 7-318939 | 12/1995 |
| JP | A 7-333574 | 12/1995 |
| JP | A 10-161597 | 6/1998 |
| JP | A 11-194313 | 7/1999 |

* cited by examiner

Primary Examiner—Sherrie Hsia
(74) Attorney, Agent, or Firm—Oliff & Berridge, PLC

(57) ABSTRACT

The projector comprises a light source that emits illuminating light, a single modulation panel, a projection optical system, a color filter mechanism, a converging optical system that converges the illuminating light on a filter surface of the color filter mechanism, and a controller for controlling the color filter mechanism and the single modulation panel. The color filter mechanism includes a rotatable filter rotor having a plurality of color filters and a plurality of light-blocking mask bands provided at the boundaries of the color filters, and a filter driver that rotates the filter rotor. The converging optical system converges the illuminating light such that the size of the illuminating light spot on the filter surface is smaller than the individual color filters.

7 Claims, 13 Drawing Sheets

OVERALL OPERATION OF FIRST EMBODIMENT

*Fig.5(a)* VFS

*Fig.5(b)* CFS

*Fig.5(c)* SP POSITION | MASK | R FILTER | MASK | G FILTER | MASK | B FILTER | MASK |

*Fig.5(d)* DATA STORE | RGB(#2) |

*Fig.5(e)* DATA TRANSFER | R(#1) | G(#1) | B(#1) | R(#2) |

*Fig.5(f)* TIME — t0 t1 t2 t3 t4 t5 t6 t7

OPERATION OF POLYPHASE DIVISION CIRCUIT 66
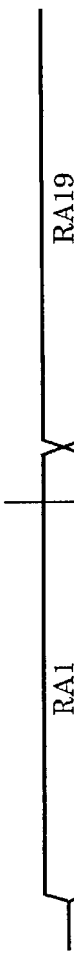
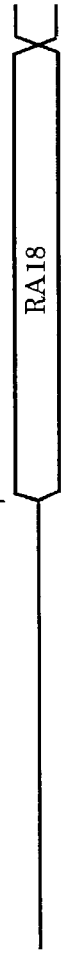
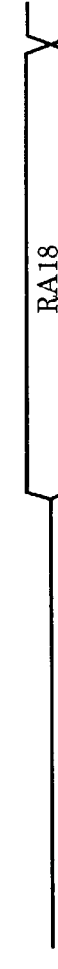
Fig. 8(a) SCLK
Fig. 8(b) CK1
Fig. 8(c) CK2
Fig. 8(d) CK18
Fig. 8(e) RA
Fig. 8(f) S/H INPUT #1
Fig. 8(g) S/H INPUT #18
Fig. 8(h) S/H OUTPUT #1
Fig. 8(i) S/H OUTPUT #18

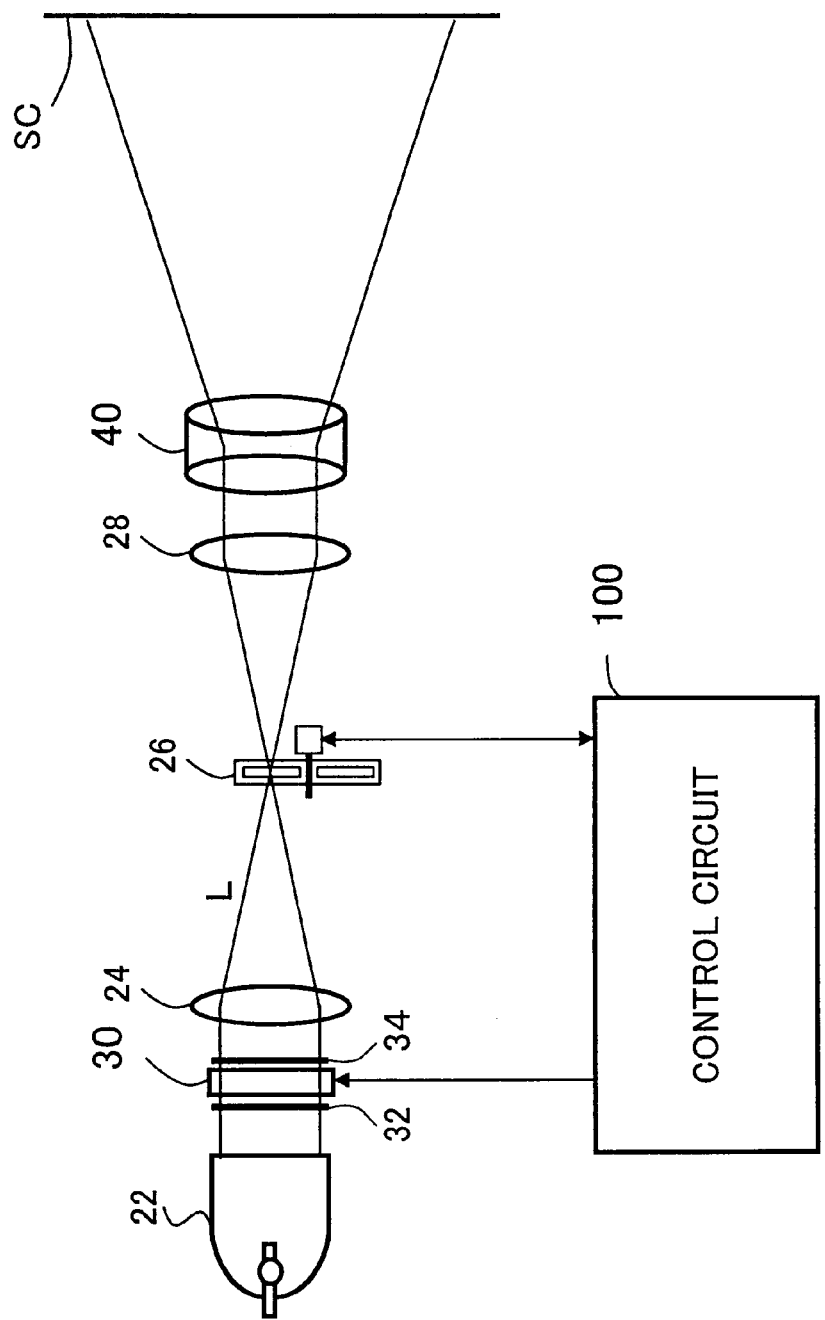
Fig. 9  SECOND EMBODIMENT

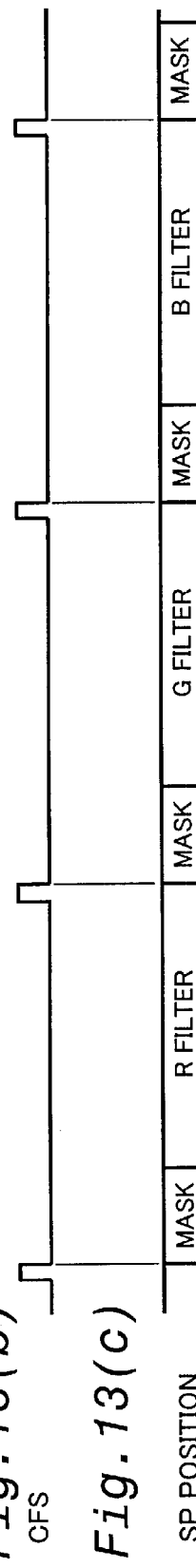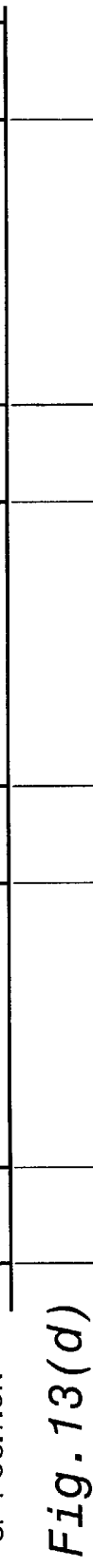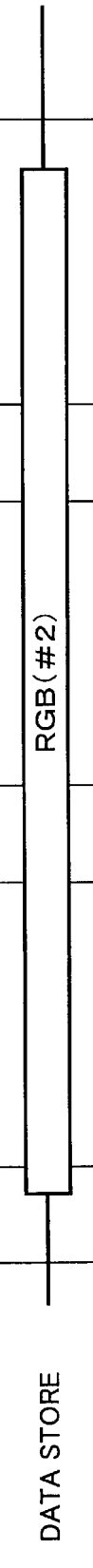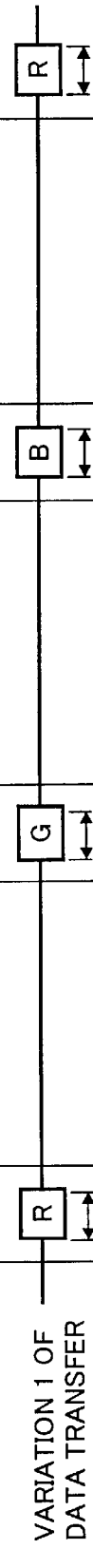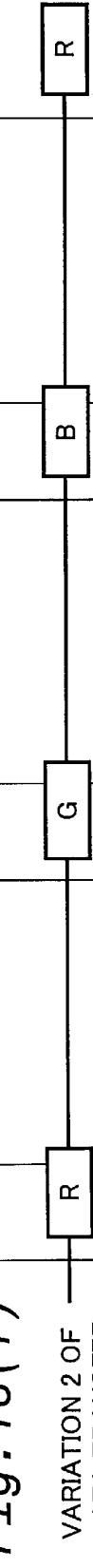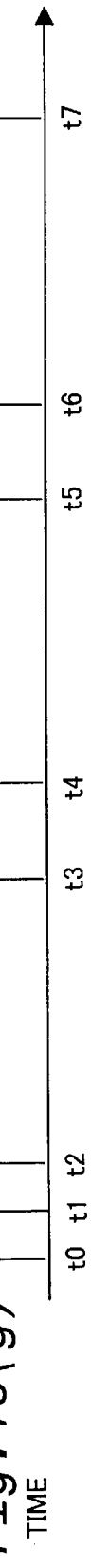
Fig. 13(a)–(g): Variation example of panel rewriting period Trw

SINGLE PANEL COLOR PROJECTOR

BACKGROUND OF THE INVENTION

1. Field of the Invention

The present invention relates to a color projector for displaying a color image with a single modulation panel.

2. Description of the Related Art

A color projector is a type of image display device for displaying color images. With a projector, light emitted from an illuminating optical system is modulated according to image signals with a modulation panel, such as a liquid crystal light valve, and the modulated light is projected onto a screen to obtain an image display. Because a modulation panel utilizes an electro-optical effect, the panel is also called an "electro-optical device."

A typical color projector comprises three liquid crystal light valves to modulate a three-color (RGB) image. However, a drawback to a projector that makes use of three liquid crystal light valves is the complexity of the optical system structure. In view of this, there has been a need for the simplification of the structure of projectors.

SUMMARY OF THE INVENTION

Accordingly, an object of the present invention is to provide a projector having a simpler structure than the conventional ones.

In order to attain at least part of the above and other related objects, there is provided a projector for projection display of a color image. The projector comprises: a light source configured to emit illuminating light; a single modulation panel configured to modulate the illuminating light responsive to a given drive signal, thereby producing image light representing an image; a projection optical system configured to project the image light; a color filter mechanism, disposed in one of an incident-side path and an emergent-side optical path of the single modulation panel, for changing the illuminating light into one of a plurality of colors in a predetermined order; a converging optical system configured to converge the illuminating light on a filter surface of the color filter mechanism; and a controller configured to control the color filter mechanism and the single modulation panel. The color filter mechanism includes: a rotatable filter rotor having a plurality of color filters and a plurality of light-blocking mask bands provided at boundaries of the color filters; and a filter driver configured to rotate the filter rotor. The converging optical system converges the illuminating light such that a size of a spot of the illuminating light on the filter surface is smaller than the individual color filters.

The structure of this projector is simple because a color image can be projected and displayed by a single modulation panel. Also, since the size of the illuminating light spot on the filter surface is small, images of various colors can be stably displayed during a period in which the illuminating light spot is present on the various color filters.

According to an aspect of the present invention, the controller writes drive signals for color components corresponding to the plurality of color filters into the single modulation panel in synchronism with rotation of the filter rotor such that the drive signals for a next color component to be displayed are transferred to the single modulation panel during a specific panel rewriting period. The specific panel rewriting period includes at least part of a masked light passage period, the masked light passage period being a period during which a masked light portion, which is a portion of the illuminating light which passes through the mask bands, passes over the modulation execution region of the single modulation panel.

In this arrangement, it will be possible to reduce flickering of the image during the panel rewriting period.

It is also preferable if the panel rewriting period is set so as to substantially coincide with the masked light passage period.

This arrangement will also reduce flickering of the image during the panel rewriting period.

It is also preferable that an incident position of the illuminating light on the filter surface is set such that the masked light portion moves over the modulation execution region substantially vertically while covering at least one line of the single modulation panel. In this case, the controller may synchronize the rotation of the filter rotor and the transfer of the drive signals to the single modulation panel such that the drive signals for the next color component will be transferred to the at least one line of the single modulation panel covered by the masked light portion.

If the drive signal for the next color component is thus transferred to a line where the masked light portion is present, the color of the illuminating light that illuminates the various parts of the modulation execution region will correspond to the color component of the drive signal being written there, so it will be possible to reduce color deviation in the displayed image.

Also, the filter rotor may further include markings near the mask bands indicating positions of the mask bands, and he color filter mechanism may include a marking sensor for identifying the markings to produce marking detection signals. In this case, the controller may synchronize the rotation of the filter rotor and the transfer of the drive signals to the single modulation panel on the basis of the marking detection signals.

In this arrangement, it will be possible for the position of the modulation panel where the masked light portion is present to correspond well with the position where the drive signal is transferred.

Also, the plurality of color filters may include at least one color filter group made up of red, green, and blue color filters, and the markings may include a first type of markings indicating starting positions of the mask bands, and a second type of markings indicating an end position of the color filter group.

In this arrangement, it will be possible to recognize the start and end timing of the projection display of an image of various color components, and the start and end timing of the projection display of one frame of an image by one color filter group.

These and other objects, features, aspects, and advantages of the present invention will become more apparent from the following detailed description of the preferred embodiments with the accompanying drawings.

BRIEF DESCRIPTION OF THE DRAWINGS

FIGS. 5(a)–5(f) are timing charts illustrating the relation between the operation of the liquid crystal panel drive circuit 130 and that of the color filter mechanism 50 in the first embodiment;

FIGS. 8(a)–8(i) are timing charts illustrating the operation of the polyphase division circuit 66;

FIG. 9 is a block diagram illustrating the overall structure of the image display device in the second embodiment;

FIGS. 13(a)–13(g) are timing charts illustrating a number of variations of the panel rewriting period.

DESCRIPTION OF THE PREFERRED EMBODIMENT

A. First Embodiment

A1. Overall Structure of the Device

Figure 1:
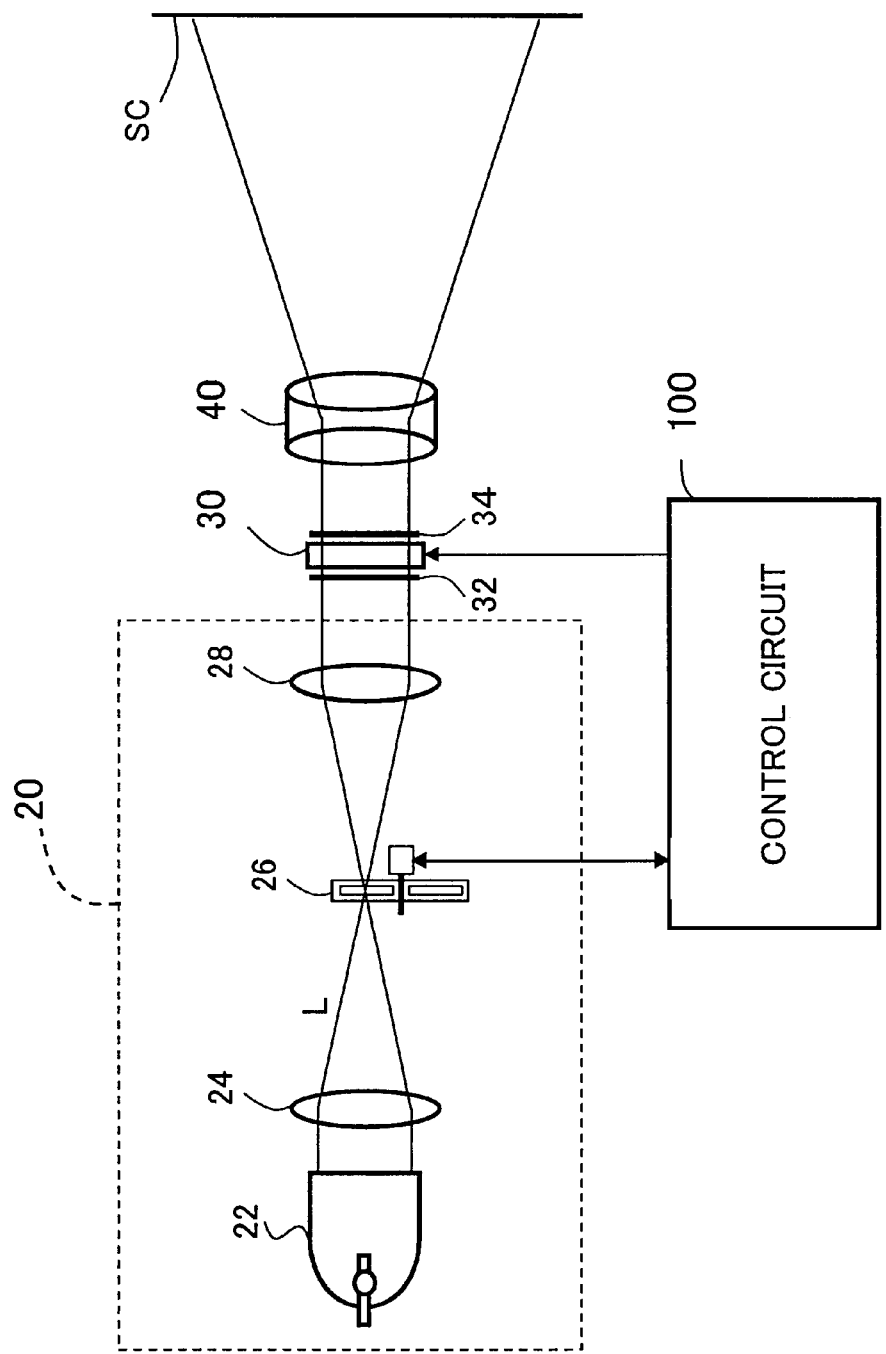
FIG. 1 is a block diagram illustrating the overall structure of the image display device in the first embodiment.

FIG. 1 is a block diagram illustrating the overall structure of the projection-type image display device in the first embodiment of the present invention. This projector comprises an illumination device 20, a single plate of liquid crystal panel 30, a projection optical system 40 that projects the image light modulated by the liquid crystal panel 30 onto a screen SC, and a control circuit 100. Polarizing plates 32 and 34 are provided on the incident-side and emergent-side optical paths, respectively, of the liquid crystal panel 30. In this Specification, the liquid crystal panel 30 will also be referred to as the "modulation panel 30."

The illumination device 20 has a light source 22, a converging lens 24, a color filter mechanism 26, and a collimating lens 28. The substantially white illuminating light L emitted from the light source 22 is converged on the filter surface of the color filter mechanism 26 by the converging lens 24. The color of the illuminating light is cyclically changed in the order of red, green, and blue with the rotating filter plate of the color filter mechanism 26. The illuminating light that has passed through the color filter mechanism 26 is converted into parallel light by the collimating lens 28, and is then incident on the liquid crystal panel 30.

The liquid crystal panel 30 is used as a transmission type of light valve (also called a "light modulator" or "light modulation panel") that modulates the illuminating light according to a given drive signal. The liquid crystal panel 30 is cyclically illuminated by three colors of illuminating light: red, green, and blue. The control circuit 100 transfers the drive signal of the next color component to the liquid crystal panel 30 in synchronism with the switch timing of the color of the illuminating light. As a result, images in the three primary colors (RGB) are cyclically displayed on the screen SC and are seen by the viewer as a color image.

Figure 2:
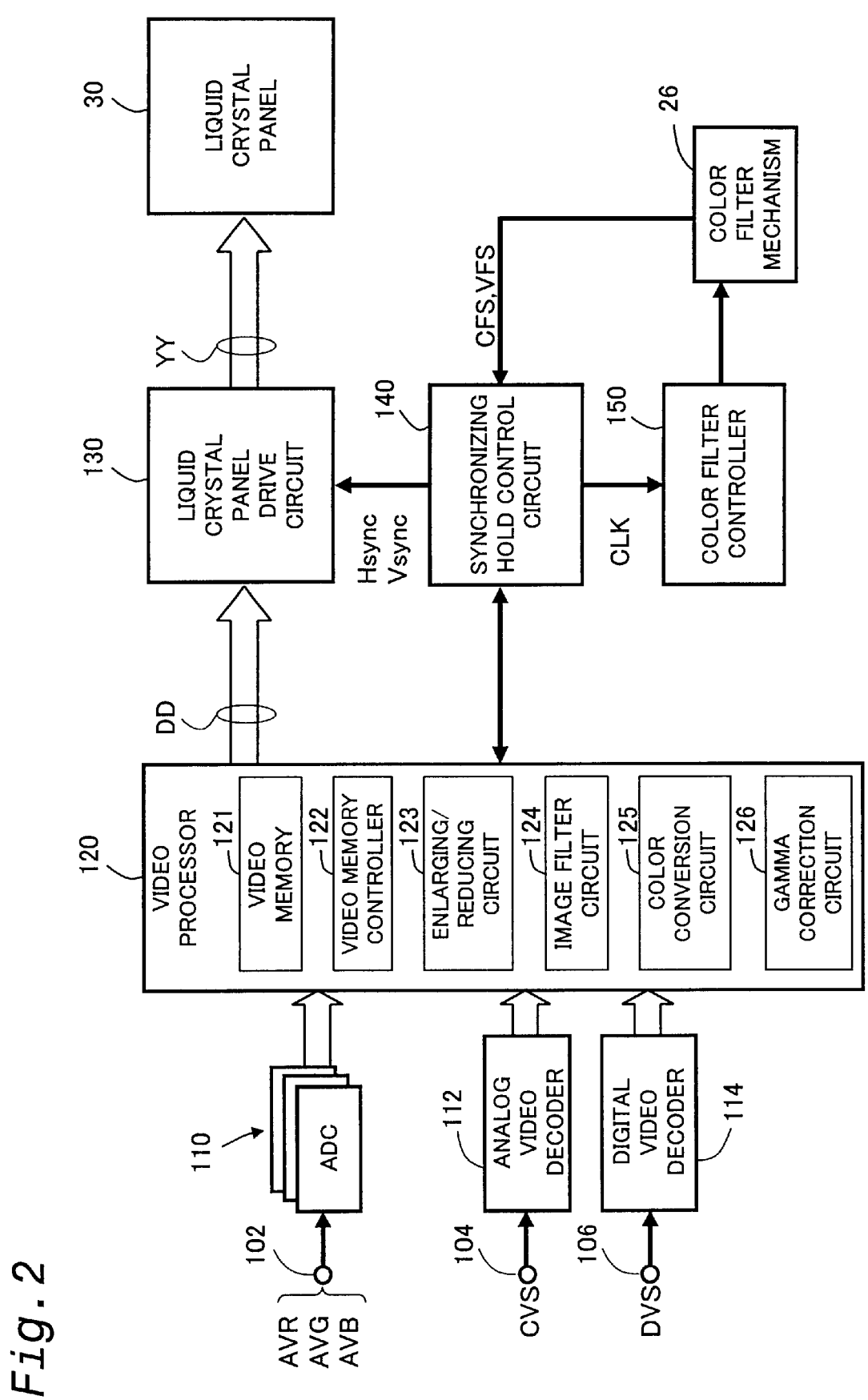
FIG. 2 is a block diagram illustrating the internal structure of the control circuit 100.

FIG. 2 is a block diagram illustrating the internal structure of the control circuit 100. This control circuit 100 is a computer system comprising a component analog image input terminal 102, a composite analog image input terminal 104, a digital image input terminal 106, an analog video decoder (synchronizing signal separation circuit) 112, a digital video decoder 114, a video processor 120, a liquid crystal panel drive circuit 130 for driving the liquid crystal panel 30, a synchronizing hold control circuit 140, and a color filter controller 150 for controlling the motor of the color filter mechanism 26. Any one of the three sets of image signals inputted to the three input terminals 102, 104, and 106 can be selectively used as the input signal for image display.

The video processor 120 has a video memory 121, a video memory controller 122, an enlarging/reducing circuit 123, an image filter circuit 124, a color conversion circuit 125, and a gamma correction circuit 126. The circuits 123 to 126 consist of dedicated hardware circuits, but the functions of these circuits 123 to 126 can also be executed by having a CPU (not shown) in the video processor 120 execute a program.

The image signals input to the video processor 120 are temporarily stored in the video memory 121, then read out and supplied to the liquid crystal panel drive circuit 130. During this writing and reading, the video processor 120 carries out various image processing on the inputted image signals, such as enlargement or reduction, filter processing, color conversion, or gamma correction. The liquid crystal panel drive circuit 130 produces a drive signal YY (also called a "data signal" or "image data signal") for driving the liquid crystal panel 30 according to a given drive signal DD. The drive signal YY is transferred from the liquid crystal panel drive circuit 130 to the liquid crystal panel 30 for every color component in synchronism with the rotation of the color filter mechanism 26. The liquid crystal panel 30 modulates the illuminating light according to this drive signal YY.

A2. Structure of the Color Filter Mechanism 26

Figure 3:
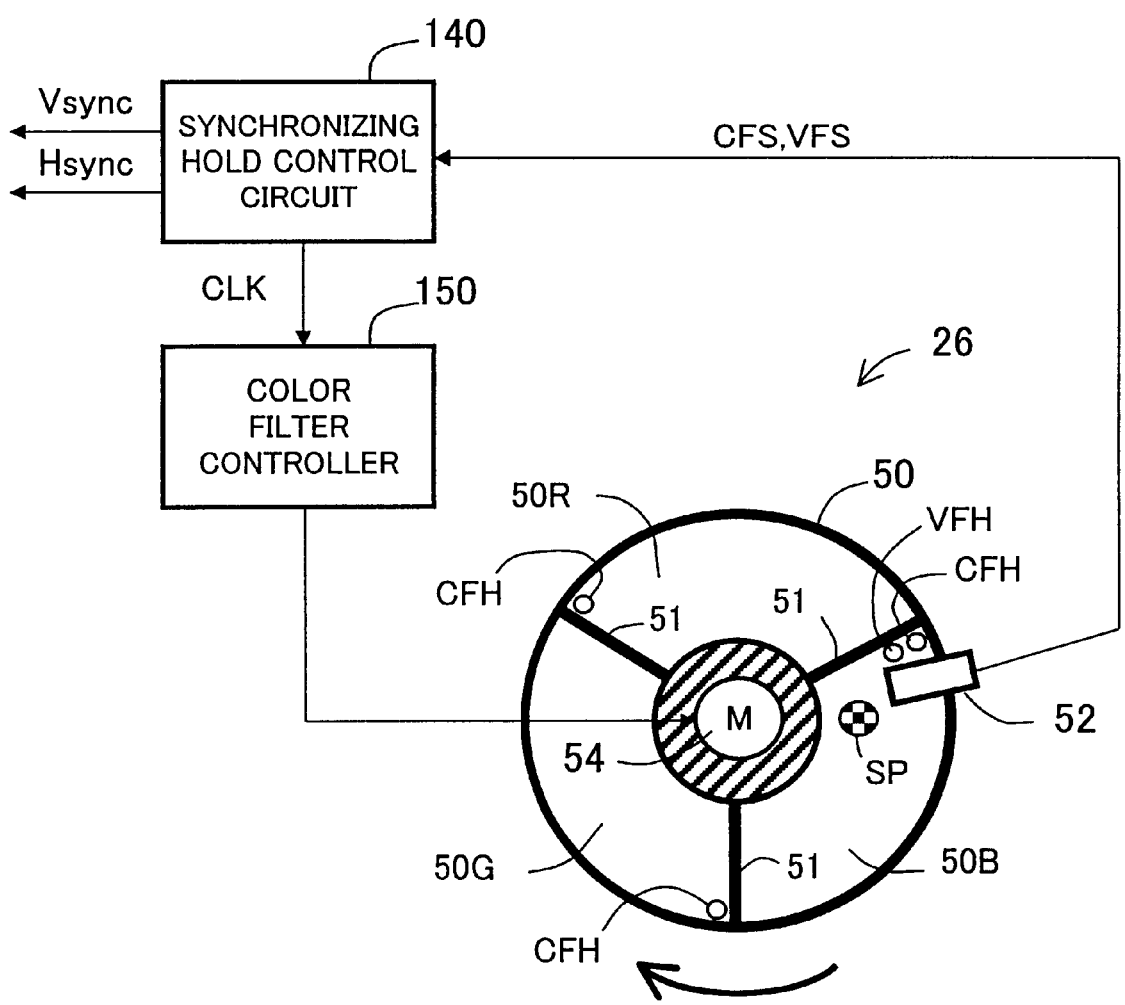
FIG. 3 is a diagram illustrating the structure of the color filter mechanism 26 in the first embodiment.

FIG. 3 is a diagram illustrating the structure of the color filter mechanism 26 in the first embodiment. The color filter mechanism 26 comprises a disk-shaped filter plate 50, a marking sensor 52 provided at a location passed by the outer periphery of the filter plate 50, and a motor 54 for rotating the filter plate 50. The filter plate 50 has a red filter 50R, a green filter 50G, a blue filter 50B, and three mask bands 51 provided at the boundaries between the filters. The three color filters 50R, 50G, and 50B all have the same fan shape, spreading out in an arc of about 120°.

A color flag hole CFH is provided in the vicinity of each of the mask bands 51. In addition to the color flag holes CFH, a vertical retrace flag hole VFH is also provided in the vicinity of the mask band 51 at the boundary between the blue filter 50B and the red filter 50R. The color flag holes CFH and the vertical retrace flag hole VFH are openings through the filter plate 50, and function as markings read by the marking sensor 52. The marking sensor 52 has a plurality of sets of photodiodes and photo-sensors (not shown) for reading these flag holes CFH and VFH.

The marking sensor 52 outputs a color flag detection signal CFS indicating that a color flag hole CFH has been detected, and a vertical retrace flag detection signal VFS indicating that the vertical retrace flag hole VFH has been detected. In the embodiment in FIG. 3, the filter plate 50 rotates clockwise, and the flag holes CFH and VFH are provided slightly ahead of the mask bands 51 in the clockwise direction. The region of illuminating light SP (hereinafter referred to as "light spot SP") on the surface of the filter plate 50 is set to a location that is ahead of the marking sensor 52 in the clockwise direction. Therefore, the generation of a pulse of a color flag detection signal CFS means that the light spot SP has reached the rear end of one color filter and will enter the region of a mask band 51 soon. The generation of a pulse of a vertical retrace flag detection signal VFS means that the light spot SP has passed through the three color filters one time. The reason this flag VFH is called a "vertical retrace flag" is that the position of this flag VF corresponds to the start or end position of a video signal in the vertical retrace period.

When the light spot SP is present in the region of a color filter of a given color, the entire surface of the liquid crystal panel 30 is illuminated by illuminating light of this color, and an image of that color is projected onto the screen. On the other hand, when the light spot SP is in the vicinity of a mask band 51, part of the liquid crystal panel 30 is in a shadow, so the colors of the illuminating light are different at the upper and lower parts of the liquid crystal panel. In this event, the image projected onto the screen may include shading or may include image portions of different colors. This tells us that it is preferable for the illuminating light to be converged so that the light spot SP will be as small as possible on the surface of the color filter in order for an image of stable color to be projected onto the screen.

As long as the vertical retrace flag hole VFH, the color flag holes CFH, and the marking sensor 52 do not overlap with the light spot SP, the vertical retrace flag hole VFH, the color flag holes CFH, and the marking sensor 52 may be provided anywhere within the inner periphery of the filter plate 50.

The synchronizing hold control circuit 140 produces a vertical synchronization signal Vsync and a horizontal synchronization signal Hsync on the basis of the color flag detection signals CFS and the vertical retrace flag detection signal VFS, and supplies these signals to the liquid crystal panel drive circuit 130 (FIG. 2). The liquid crystal panel drive circuit 130 transfers the drive signal YY to the liquid crystal panel 30 in synchronism with these synchronization signals Vsync and Hsync. The synchronizing hold control circuit 140 also supplies a clock signal CLK synchronous to the detection signals CFS and VFS to the color filter controller 150. The color filter controller 150 keeps the rotational speed of the motor 54 of the color filter mechanism 26 synchronized to this clock signal CLK. Thus, the transfer of the drive signal YY by the liquid crystal panel drive circuit 130 and the rotation of the motor 54 in the color filter mechanism 26 are adjusted by the synchronizing hold control circuit 140 so as to be synchronized to each other.

As can be seen from the above description, the video processor 120, the liquid crystal panel drive circuit 130, the synchronizing hold control circuit 140, and the color filter controller 150 shown in FIG. 2 realize the functions of the controller in the present invention.

A3. Structure and Operation of the Liquid Crystal Panel Drive Circuit 130

Figure 4:
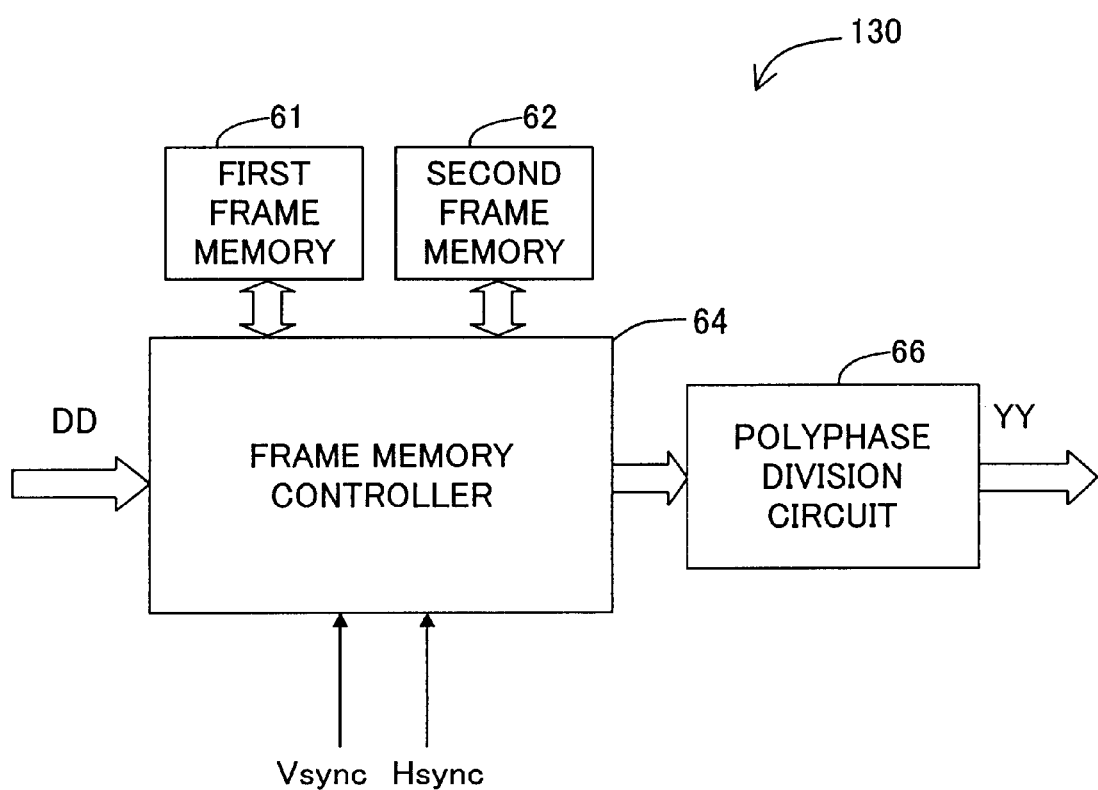
FIG. 4 is a block diagram illustrating the internal structure of the liquid crystal panel drive circuit 130.

FIG. 4 is a block diagram illustrating the internal structure of the liquid crystal panel drive circuit 130. The liquid crystal panel drive circuit 130 comprises two frame memories 61 and 62, a frame memory controller 64, and a polyphase division circuit 66. The frame memory controller 64 keeps the frame memories 61 and 62 synchronized to the synchronization signals Vsync and Hsync supplied from the synchronizing hold control circuit 140 (FIG. 2). Specifically, the frame memory controller 64 toggles between the two frame memories 61 and 62 while writing to one the image data DD supplied from the video processor 120, and at the same time reading from the other the image data DD and giving it to the polyphase division circuit 66.

The polyphase division circuit 66 converts the image data DD read from the frame memories into a number of parallel analog drive signals YY that can be received by the liquid crystal panel 30, and supplies these to the liquid crystal panel 30.

FIGS. 5(a)–5(f) are timing charts illustrating the relation between the operation of the liquid crystal panel drive circuit 130 and that of the color filter mechanism 50 in the first embodiment. FIG. 5(a) shows the vertical retrace flag detection signal VFS, and FIG. 5(b) shows the color flag detection signals CFS. The length of one period of the vertical retrace flag detection signal VFS is called a "frame period." Three pulses of color flag detection signals CFS are generated during one frame period from time t0 to time t7. As shown in FIG. 5(c), one period of color flag detection signals CFS includes a period in which the light spot SP moves over the mask bands 51(FIG. 3) and another period in which the light spot SP moves through the regions of the color filters. For instance, from time t0 to t2 in FIG. 5(c), the light spot SP moves over a mask band 51, and from time t2 to t3, the light spot SP moves through the region of the red filter 50R. From time t0 to t2, during which the light spot SP is moving over the mask band 51, the shadow of the mask band 51 moves over the liquid crystal panel 30. From time t2 to t3, during which the light spot SP is moving through the region of the red filter 50R, the entire liquid crystal panel 30 is illuminated by red illuminating light.

Figure 6A:
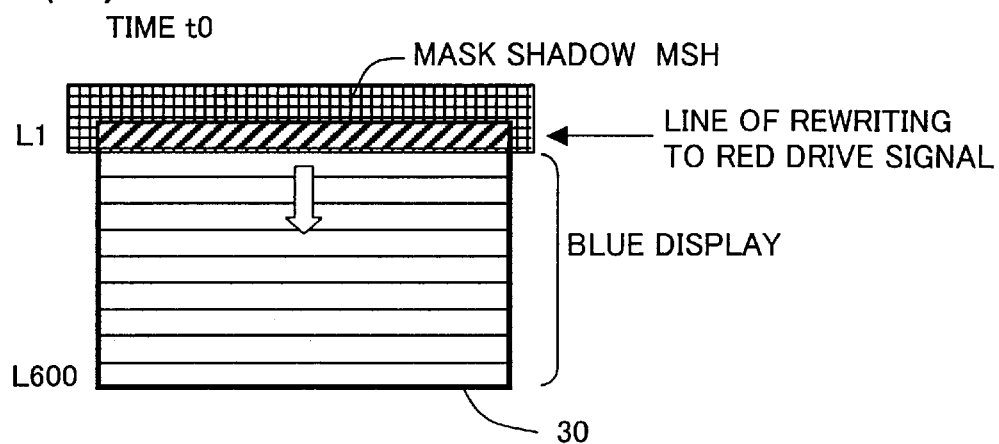
FIGS. 6(A)–6(C) illustrate the state of the illuminating light on the liquid crystal panel during times t1 to t3 in FIGS. 5(a)–5(f)
Figure 6B:
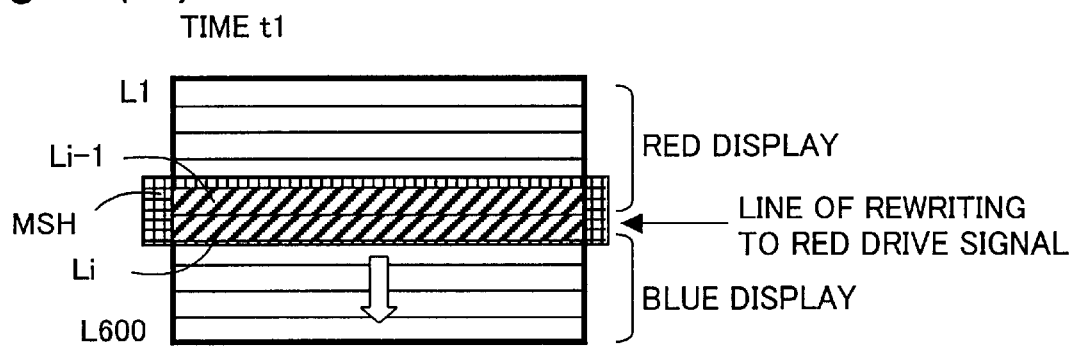
Figure 6C:
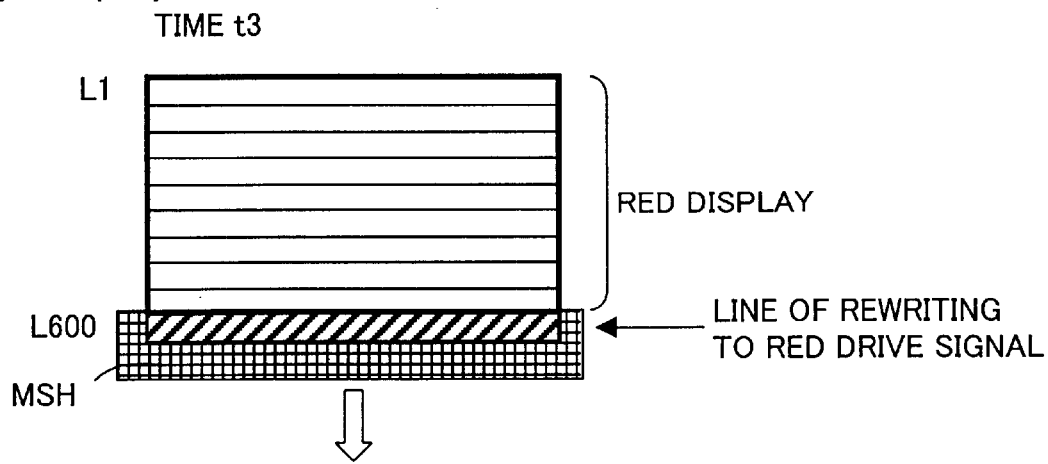

FIGS. 6(A)–6(C) illustrate the state of the illuminating light on the liquid crystal panel during time t1 to t3 in FIG. 5(c). At time t0, at which the light spot SP begins to go onto the mask band 51, the shadow of the mask band 51 begins to slide over the top of the liquid crystal panel 30, as shown in FIG. 6(A). Hereinafter, the shadow of the mask band 51 will be called the "mask shadow MSH." The mask shadow MSH corresponds to the "masked light portion" in the present invention.

In the example of FIG. 6(A), the line L1 at the top end is covered by the mask shadow MSH, and the lines starting with the second from the top are illuminated by blue illuminating light. Hereinafter, that region of the incident light surface of the liquid crystal panel 30 in which modulation is performed will be called the "modulation execution region." In the example of FIG. 6(A), the modulation execution region has 600 horizontal lines.

In this embodiment, the drive signals of the various pixels on the line covered by the mask shadow MSH are rewritten to the drive signals of the next color component in synchronism with the movement of the mask shadow MSH over the modulation execution region of the liquid crystal panel 30. For instance, in the state of FIG. 6(A), drive signals of the red component read from the first frame memory 61 (FIG. 4) of the liquid crystal panel drive circuit 130 are written to the various pixels of the line L1 covered by the mask shadow MSH. The drive signals of the blue components are maintained for the pixels on the second and lower lines.

The term "pixel" as used in this Specification refers to the display units in a display device. The phrase "drive signals are written to pixels" in this Specification corresponds to the signals for driving specific display units being given to the display units.

In this embodiment, the liquid crystal panel 30 is used as a display device. In this case, "pixel" is the portion defined by the pixel electrode, and includes at least the pixel electrode, the common electrode, and the liquid crystal portion sandwiched between these electrodes. The phrase "drive signals are written to pixels" as used in this embodiment means that a voltage corresponding to the drive signal is applied between a specific pixel electrode and the common electrode.

When the drive signals of the next color component are written to the pixels on this line L1 while the line L1 is covered by the mask shadow MSH, the polyphase division circuit 66 (FIG. 4) in the liquid crystal panel drive circuit 130 transfers the drive signals for a plurality of pixels in parallel. The structure and operation of this polyphase division circuit 66 will be discussed later.

As shown in FIG. 6(B), at time t1, which is in between time t0 and t2, the mask shadow MSH covers two lines Li-1 and Li in the approximate center of the liquid crystal panel 30. In this state, drive signals of the red component are written to the pixels on these lines Li-1 and Li. The drive signals of the pixels on the lines above the mask shadow MSH have already been rewritten to the red component, while the drive signals for the pixels on the lines below the mask shadow MSH are maintained for the blue component.

As shown in FIG. 6(C), at time t2, the mask shadow MSH covers line L600 at the bottom end of the liquid crystal panel 30, and the drive signals for the red component are written to the pixels on this line L600. The drive signals for the pixels on the other lines have already been rewritten to the red component.

In the example of FIGS. 6(A) to 6(C), the mask shadow MSH is wide enough to cover two lines. The mask shadow MSH may, however, be only wide enough to cover one line. Still, being wide enough to cover about two or three lines is advantageous in that it will be easier to synchronize the movement of the mask shadow MSH to the writing of the drive signals. Also, in the example of FIGS. 6(A) to 6(C), the mask shadow MSH is drawn in a rectangular shape moving vertically over the liquid crystal panel 30, but as can be seen from the structure in FIG. 3, a fan-shaped shadow actually moves while rotating considerably. Here again, though, the mask shadow MSH can be viewed as moving substantially vertically over the liquid crystal panel 30.

Thus, from time t0 to t2, drive signals of the red component read from the first frame memory 61 are written to the pixels on the lines covered by the mask shadow MSH in synchronism with the substantially vertical movement of the mask shadow MSH over the modulation execution region of the panel 30 (FIG. 5(f)). Immediately thereafter, from time t2 to t3, the entire panel 30 is illuminated with red illuminating light, and as a result, a red image is stably projected and displayed on the screen.

Similarly, from time t3 to t4, the drive signals of the green component read from the first frame memory 61 are written to the pixels in synchronism with the movement of the mask shadow MSH, and from time t4 to t5, a green image is projected and displayed on the screen. From time t5 to t6, the drive signals of the blue component read from the first frame memory 61 are written to the pixels in synchronism with the movement of the mask shadow MSH, and from time t6 to t7, a blue image is projected and displayed on the screen.

As can be seen from FIGS. 6(A)–6(C), in the first embodiment, images are projected and displayed in a state in which the color component of the drive signals maintained for the pixels always coincides with the color of the illuminating light that illuminates the various pixels. If the color component of the drive signals maintained for the pixels is different from the color of the illuminating light that illuminates the pixels, then color deviation will be observed in the image on the screen. This color deviation of an image can be prevented with this embodiment.

While the drive signals of the various color components are being read from the first frame memory 61 and transferred to the liquid crystal panel 30 in this manner, drive signals of three colors that will be transferred to the liquid crystal panel 30 in the next frame period are stored in a second frame memory 62 (FIG. 5(d)). In the next frame period starting at time t7, the drive signals read from the second frame memory 62 are transferred to the liquid crystal panel 30.

Thus, in the first embodiment, drive signals of the next color component are written to the pixels on the lines covered by the mask shadow MSH in synchronism with the movement of the mask shadow MSH over the modulation execution region of the liquid crystal panel 30. Therefore, when the entire liquid crystal panel 30 is illuminated with illuminating light of the next color in the immediately subsequent period, an image of that color will be stably projected and displayed on the screen. As a result, it is possible to prevent color deviation in an image that occurs when the color component of the drive signals maintained for the various pixels is different from the color of the illuminating light that illuminates the pixels.

Also, since the substantially white illuminating light emitted from the light source 22 is converged on the filter surface in this embodiment, the combined total of the times t0 to t2, t3 to t4, and t5 to t6 during which the mask shadow MSH moves over the liquid crystal panel 30 is sufficiently shorter than the length of one frame period (t0 to t7). As a result, the entire liquid crystal panel 30 is illuminated by the illuminating light of each color for a sufficiently long time. As can be understood from this, in general, the shorter is the total time it takes for the mask shadow MSH to move over the liquid crystal panel 30, the longer the illuminating light of each color will stay on, allowing a brighter image to be displayed. The total time during which the mask shadow MSH moves over the liquid crystal panel 30 is preferably set to no more than approximately 20% of the length of one frame period. Setting to no more than approximately 10% is even better. The time it takes for the mask shadow MSH to move over the liquid crystal panel 30 can be adjusted by adjusting the size of the light spot SP on the filter surface and the width of the mask bands 51. The mask bands 51 are preferably wide enough that the mask shadow MSH (FIG. 6(A) will cover at least one line of the liquid crystal panel 30.

A3. Structure and Operation of the Polyphase Division Circuit 66

Figure 7:
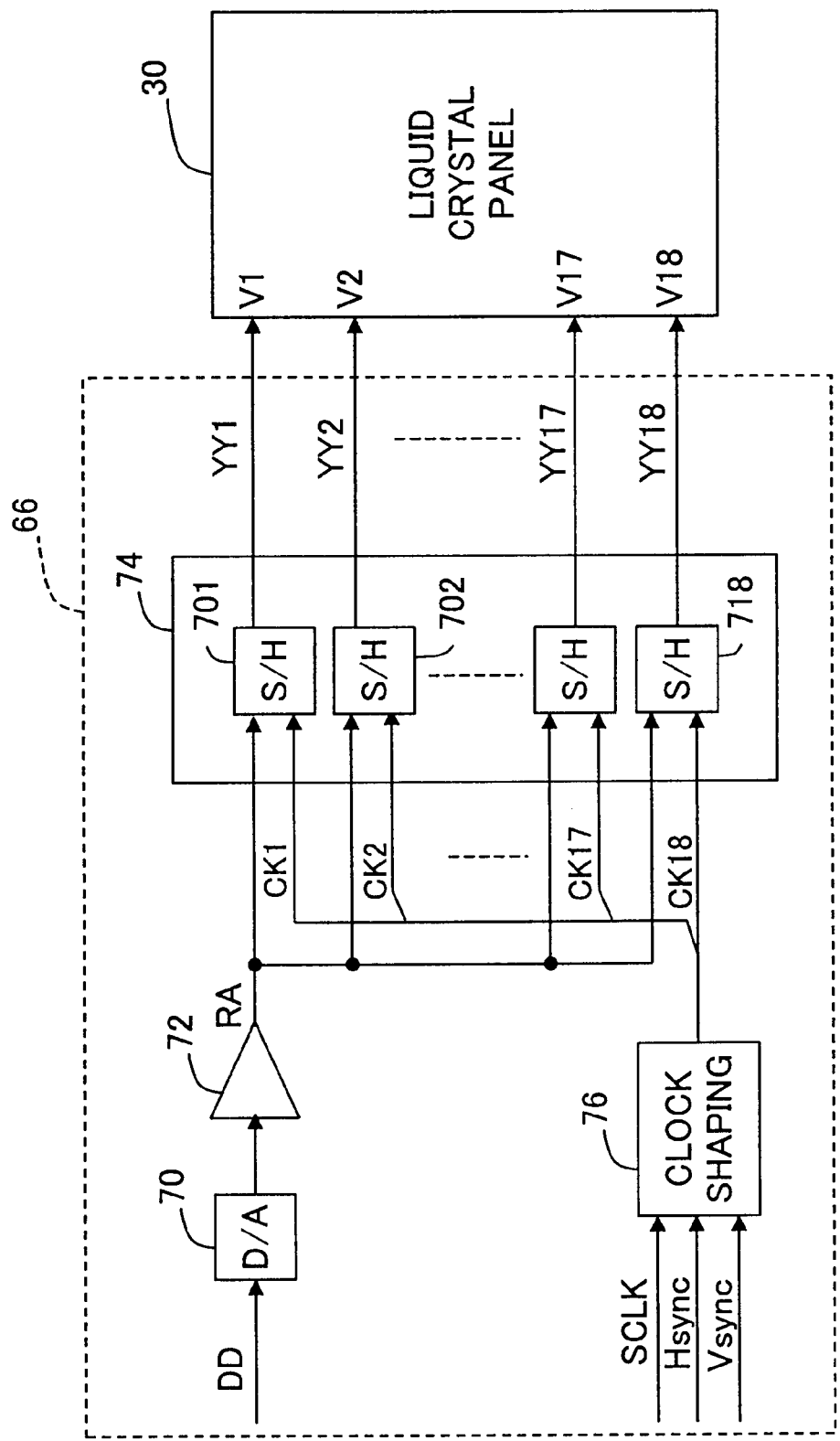
FIG. 7 is a block diagram illustrating the internal structure of the polyphase division circuit 66 in the liquid crystal panel drive circuit 130.

FIG. 7 is a block diagram illustrating the internal structure of the polyphase division circuit 66 in the liquid crystal panel drive circuit 130. The polyphase division circuit 66 comprises a D-A converter 70, an amplifier 72, a sample-and-hold unit 74 including 18 sample-and-hold circuits 701–718, and a clock shaping circuit 76. The D-A converter 70 converts the image data DD read from either of the two frame memories 61 and 62 into analog drive signals and supplies them to the amplifier 72. The analog drive signals RA amplified by the amplifier 72 are commonly input to the eighteen sample-and-hold circuits 701–718. The clock shaping circuit 76 generates clock signals CK1–CK18 from the synchronization signals Vsync and Hsync and a standard clock signal SCLK supplied from the frame memory controller 64 (FIG. 4), and supplies these to the sample-and-hold circuits 701–718. The sample-and-hold circuits 701–718 output drive signals YY1–YY18 for eighteen pixels responsive to the clock signals CK1–CK18 given by the clock shaping circuit 76. As a result, these drive signals YY1–YY18 are simultaneously written to the eighteen pixels in the liquid crystal panel 30.

FIGS. 8(a)–8(i) are timing charts illustrating the operation of the polyphase division circuit 66. The eighteen clock signals CK1–CK18 (FIGS. 8(b) to 8(d)) are produced by selecting the pulse of the standard clock signal SCLK (FIG. 8(a)) supplied from the frame memory controller 64, at a timing that is successively altered one period at a time. Specifically, the clock signals CK1–CK18 generate only one pulse for every 18 pulses generated by the standard clock signal SCLK, and the pulses of the clock signals CK1–CK18 are generated in a sequence that is staggered by one period of the standard clock signal SCLK.

The D-A converter 70 converts one pixel's worth of image data of one color into an analog signal in synchronism with the standard clock signal SCLK. Therefore, analog drive signals RA1–RA18 for the pixels are outputted from the amplifier 72 in synchronism with the standard clock signal SCLK (FIG. 8 (e)). The sample-and-hold circuits 701–718 hold the analog drive signals RA1–RA18 responsive to rise edges of the clock signals CK1–CK18, respectively (FIGS. 8(f) and 8(g)). Two hold circuits are provided within each of the first seventeen sample-and-hold circuits 701–717, and drive signals RA1–RA17 are transferred from the input-side hold circuit to the output-side hold circuit responsive to the eighteenth clock signal CK18. As a result, the drive signals RA1–RA18 for 18 pixels are outputted in parallel from the eighteen sample-and-hold circuits 701–718 (FIGS. 8(h) and 8(i)).

The drive signals for 18 pixels thus outputted from the polyphase division circuit 66 are simultaneously written to the 18 pixels on the same line in the liquid crystal panel 30. Thus, in this first embodiment, drive signals for 18 pixels are written simultaneously to the liquid crystal panel 30, so it is possible to write the drive signals for the next color component to the various pixels on a line while that line is covered by the mask shadow MSH.

B. Second Embodiment

FIG. 9 is a block diagram illustrating the overall structure of the image display device in the second embodiment. With this image display device, the liquid crystal panel 30 and polarizing plates 32 and 34 in front and back thereof are positioned between the light source 22 and the converging lens 24, while the rest of the structure is the same as in the first embodiment shown in FIG. 1. With this second embodiment, the shadow of the mask band 51 on the filter plate 50 is never formed on the liquid crystal panel 30. When the filter plate 50 rotates, however, a portion of the light that will illuminate the mask band 51 (that s the "masked light portion") still moves over the liquid crystal panel 30. In view of this, the drive signals for the next color component are written in synchronism with the movement of this masked light portion over the liquid crystal panel 30.

Again with this second embodiment, just as with the first embodiment, it is possible to prevent color deviation and flickering of the image, and a brighter image can be displayed.

C. Third Embodiment

Figure 10:
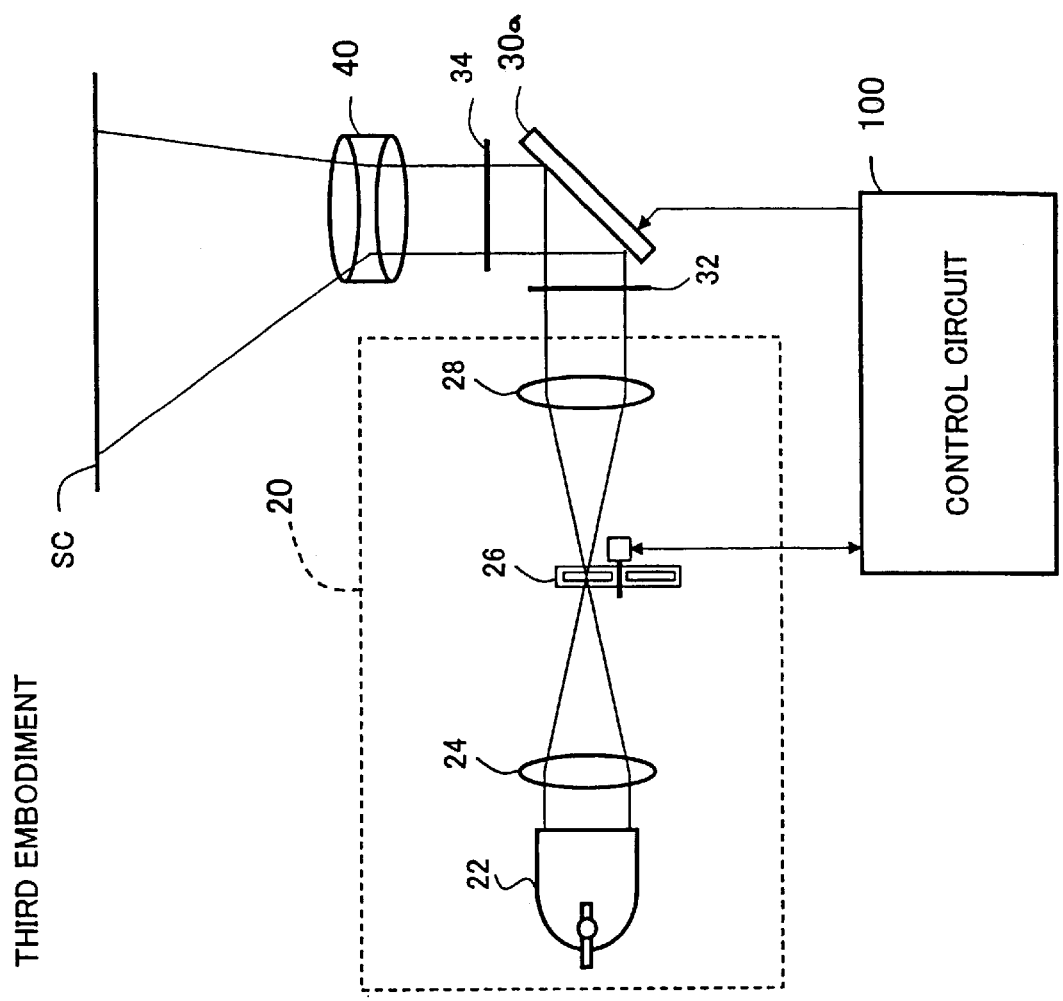
FIG. 10 is a block diagram illustrating the overall structure of the image display device in the third embodiment.

FIG. 10 is a block diagram illustrating the overall structure of the image display device in the third embodiment. With this image display device, the transmission type liquid crystal panel 30 used in the first embodiment shown in FIG. 1 is replaced with a reflection type liquid crystal panel 30a, while the rest of the structure is the same as in the first embodiment. Again with this third embodiment, just as with the first embodiment, it is possible to prevent color deviation and flickering of the image, and a brighter image can be displayed.

D. Variation of Color Filter Mechanism

Figure 11:
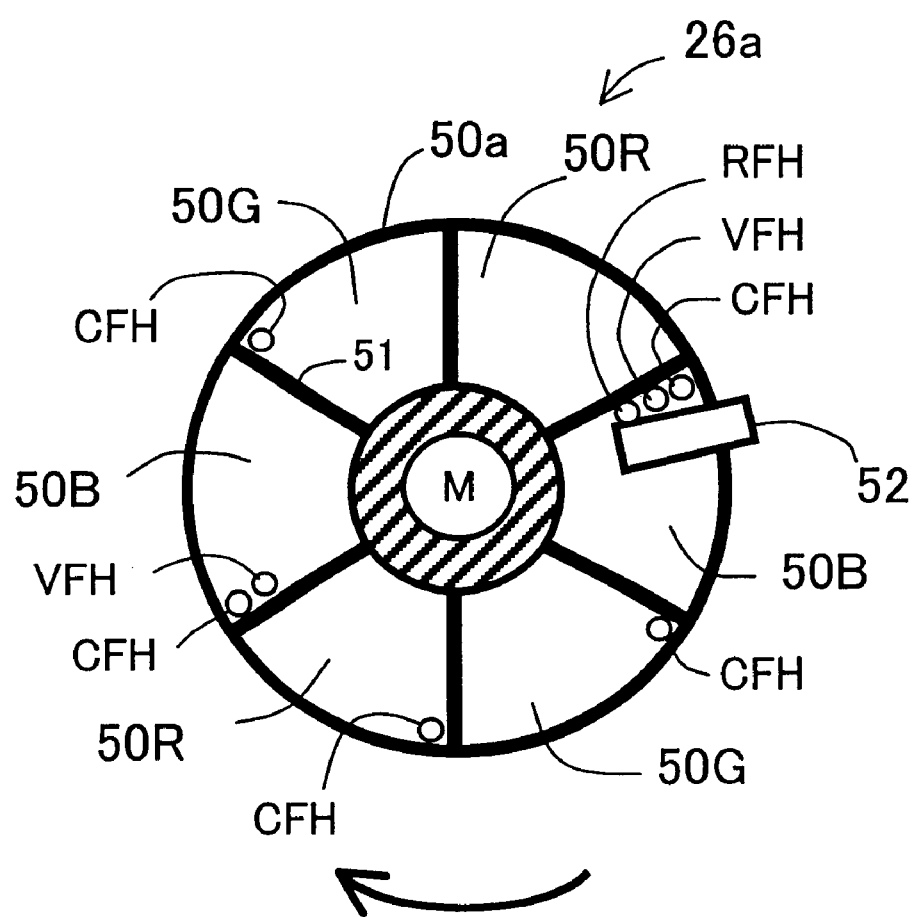
FIG. 11 is a diagram illustrating a first variation of the color filter mechanism.

FIG. 11 is a diagram illustrating a first variation of the color filter mechanism. The filter plate 50a of this color filter mechanism 26a is partitioned by six mask bands 51 into six fan-shaped filter regions spreading out in an arc of about 60°, and there are two sets of filters 50R, 50G, and 50B for three colors.

Just as with the color filter mechanism 26 shown in FIG. 3, color flag holes CFH are provided in the vicinity of the mask bands 51. In addition to the color flag holes CFH, vertical retrace flag holes VFH are also provided in the vicinity of the two mask bands 51 at the boundaries between the blue filters 50B and the red filters 50R. A rotation flag hole RFH indicating that the filter plate 50a has made one rotation is also provided to one of these two mask bands 51.

When this color filter mechanism 26a is used, the period in which the filter plate 50a makes one-half rotation corresponds to one frame period. The rest of the structure and operation is the same as when the color filter mechanism 26 shown in FIG. 3 was used.

With this color filter mechanism, the rotational speed of the motor 54 is cut in half, so electrode consumption is reduced. Meanwhile, when the rotational speed is maintained the same, the color switching frequency doubles, so there is a reduction in flickering.

Figure 12:
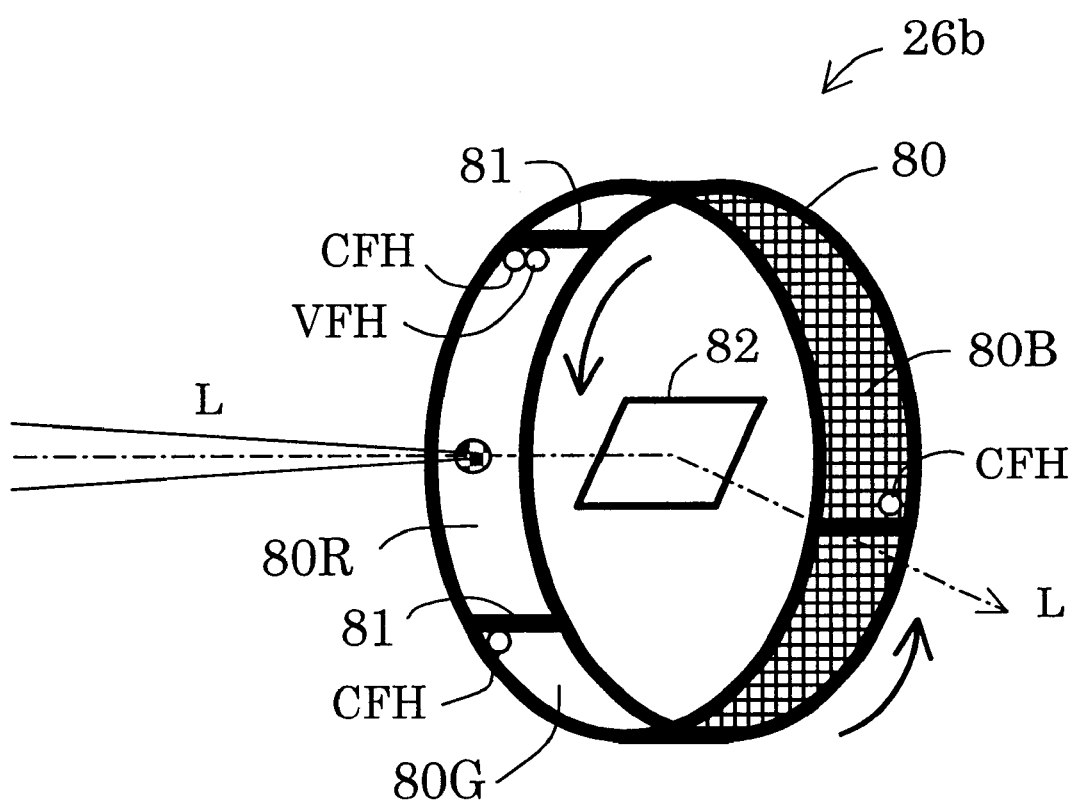
FIG. 12 is a diagram illustrating a second variation of the color filter mechanism.

FIG. 12 is a diagram illustrating a second variation of the color filter mechanism. This color filter mechanism 26b has a ring-shaped filter 80 and a mirror 82 provided near the center of the ring-shaped filter 80. The ring-shaped filter 80 has a red filter 80R, a green filter 80G, a blue filter 80B, and three mask bands 81 provided at the boundaries between these filters. The three color filters 80R, 80G, and 80B all have the a rectangular shape of the same length.

Just as with the filter plate 50 shown in FIG. 3, color flag holes CFH are provided in the vicinity of the mask bands 81. In addition to the color flag holes CFH, a vertical retrace flag hole VFH is also provided in the vicinity of the mask band 81 at the boundary between the blue filter 80B and the red filter 80R. Although not depicted in the figure, a marking sensor for reading the flag holes, and a motor for driving the ring-shaped filter 80 are provided around the outer periphery of the ring-shaped filter 80.

Again with this color filter mechanism 26b, the illuminating light L is converged at the filter surface. The illuminating light that passes through the filter surface is reflected by the mirror 82 and guided to the outside of the ring-shaped filter 80. In FIG. 12, the divergence of the illuminating light L that has passed through the filter surface is not shown, and just the central light rays are shown.

As can be understood from the above variations, it is possible for a variety of filter rotors, such as those in the form of a disk or ring, to be used in the present invention. Still, advantages to using a disk-shaped filter plate are that the structure of the color filter mechanism will be simpler and the overall color filter mechanism can be more compact. On the other hand, an advantage to using a ring-shaped filter is that it is easier to adjust the relationship between the length of one frame period and the period during when the mask shadow MSH (that is, the masked light portion) moves over the liquid crystal panel 30. Another advantage with a ring-shaped filter is that since the mask shadow MSH moves vertically over the liquid crystal panel 30, rewriting of the drive signals synchronized to the mask shadow MSH can be carried out more easily.

E. Other Variations

E1. Variation 1

Although a liquid crystal panel is used as the single-plate modulation panel in the above embodiments, the present invention can also be applied to image display devices that make use of a variety of modulation panels other than a liquid crystal panel. For instance, in the image display device in FIG. 10, it is possible to use an emission direction control type of modulation panel, in which the light emission direction is controlled for each pixel, as with a DMD (Digital Mirror Device, trademark of TI), instead of a reflection type of liquid crystal panel 30.

E2. Variation 2

In the above embodiments, the drive signals for the next color component are written to the pixels on the lines covered by the mask shadow MSH (that is, the pixels on the lines covered by the masked light portion) out of the plurality of lines included in the modulation execution region of the modulation panel. The period in which the drive signals of the modulation panel are rewritten (hereinafter referred to as the "panel rewriting period"), however, is not limited to this, and a variety of periods can be used.

FIGS. 13(a)–13(g) are timing charts illustrating a number of variations of the panel rewriting period. The difference from FIGS. 5(a)–5(f) described above is just the period Trw of data transfer (panel rewriting period) in FIG. 13(e) and 13(f), and the rest is the same as in FIGS. 5(a)–5(d). With the variation in FIG. 13(e), the panel rewriting period Trw corresponds to part of the time t0 to t2 ("masked light passage period") during which the masked light portion passes over the modulation execution region of the modulation panel. With the variation in FIG. 13(f), the panel rewriting period Trw includes part of the masked light passage period t0 to t2, and the period other than the masked light passage period t0 to t2.

As can be seen from FIG. 5(e) and FIG. 13(e) and 13(f), it is preferable for the panel rewriting period to be set to a period including at least part of the masked light passage period t0 to t2. If so, it will be possible to reduce image flicker. In particular, it is preferable for the panel rewriting period to be set so as to substantially coincide with the masked light passage period t0 to t2, as in the first embodiment illustrated in FIG. 5(e). If so, the rewriting of the panel will be carried out during the period in which the color of the illuminating light on the modulation panel changes, so images of various colors can be stably displayed in other periods. It is also preferable if the rotation of the filter rotor is synchronized with the transfer of the drive signal to the modulation panel so that the drive signals of the next color component will be transferred to the lines on which the masked light portion is present out of the plurality of lines in the modulation execution region when the masked light portion moves substantially vertically over the modulation execution region. If so, it will be possible to reduce color deviation in the displayed images.

E3. Variation 3

The converging optical system for converging the illuminating light on the surface of the filter rotor (the converging lens 24 in the embodiment in FIG. 1) is configured such that the size of the light spot SP on the surface of the filter rotor is smaller than the individual color filters. If so, a stable image can be displayed during the period in which the illuminating light spot is included in each of the color filters. With the present invention, at least the illuminating light is sufficiently converged on the filter surface, but the timing at which the drive signals are rewritten by the modulation panel can be set as desired.

E4. Variation 4

With the above embodiments, flag holes (or openings) are used to identify the positions of the various color filters (that is, the positions of the mask bands) and the start and end positions of one set of color filters comprising three colors, but a variety of markings other than openings may be used. For instance, magnetic marks can also be used as these markings.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector comprising:

a light source configured to emit illuminating light;

a single modulation panel configured to modulate the illuminating light in response to a given drive signal, thereby producing image light representing an image;

a projection optical system configured to project the image light;

a color filter mechanism, disposed in one of an incident-side path and an emergent-side optical path of the single modulation panel, for changing the illuminating light into one of a plurality of colors in a predetermined order;

a converging optical system configured to converge the illuminating light on a filter surface of the color filter mechanism; and a controller configured to control the color filter mechanism and the single modulation panel, the color filter mechanism including:

a rotatable filter rotor having a plurality of color filters and a plurality of light-blocking mask bands provided at boundaries of the color filters, markings near the mask bands, the markings indicating positions of the mask bands, a marking sensor for identifying the markings to produce marking detection signals, and the controller synchronizes the rotation of the filter rotor and the transfer of the drive signals to the single modulation panel on the basis of the marking detection signals; and a filter driver configured to rotate the filter rotor, and the converging optical system converging the illuminating light such that a size of a spot of the illuminating light on the filter surface is smaller than the individual color filters.

2. A projector as defined in claim 1, wherein the plurality of color filters include at least one color filter group made up of red, green, and blue color filters, and the markings include a first type of markings indicating starting positions of the mask bands, and a second type of markings indicating an end position of the color filter group.

3. A projector comprising:

a light source configured to emit illuminating light;

a single modulation panel configured to modulate the illuminating light in response to a given drive signal, thereby producing image light representing an image, the single modulation panel having a modulation execution region on which the modulation of light is executed;

a projection optical system configured to project the image light;

a color filter mechanism, disposed in one of an incident-side path and an emergent-side optical path of the single modulation panel, for changing the illuminating light into one of a plurality of colors in a predetermined order;

a converging optical system configured to converge the illuminating light on a filter surface of the color filter mechanism; and a controller configured to control the color filter mechanism and the single modulation panel, the color filter mechanism including:

a rotatable filter rotor having a plurality of color filters and a plurality of light-blocking mask bands provided at boundaries of the color filters; and a filter driver configured to rotate the filter rotor, and the controller writing drive signals for color components corresponding to the plurality of color filters into the single modulation panel in synchronism with rotation of the filter rotor such that the drive signals for a next color component to be displayed are transferred to the single modulation panel during a specific panel rewriting period, the specific panel rewriting period including at least part of a masked light passage period, the masked light passage period being a period during which a masked light portion, which is a portion of the illuminating light which passes through the mask bands, passes over the modulation execution region of the single modulation panel.

4. A projector as defined in claim 3, wherein the panel rewriting period is set so as to substantially coincide with the masked light passage period.

5. A projector as defined in claim 4, wherein an incident position of the illuminating light on the filter surface is set such that the masked light portion moves over the modulation execution region substantially vertically while covering at least one line of the single modulation panel, and wherein the controller synchronizes the rotation of the filter rotor and the transfer of the drive signals to the single modulation panel such that the drive signals for the next color component will be transferred to the at least one line of the single modulation panel covered by the masked light portion.

6. A projector as defined in claims 3, wherein the filter rotor further includes markings near the mask bands, the markings indicating positions of the mask bands, the color filter mechanism includes a marking sensor for identifying the markings to produce marking detection signals, and the controller synchronizes the rotation of the filter rotor and the transfer of the drive signals to the single modulation panel on the basis of the marking detection signals.

7. A projector as defined in claim 6, wherein the plurality of color filters include at least one color filter group made up of red, green, and blue color filters, and the markings include a first type of markings indicating starting positions of the mask bands, and a second type of markings indicating an end position of the color filter group.

* * * * *